United States Patent
Horsfield (10) Patent No.: US 9,553,455 B2
(45) Date of Patent: Jan. 24, 2017

(54) USE OF DEMAND RESPONSE TO ENABLE IMPROVED POWER SUPPLY RESTORATION PLANNING

(71) Applicant: Peter Horsfield, Doylestown, PA (US)

(72) Inventor: Peter Horsfield, Doylestown, PA (US)

(73) Assignee: Siemens Aktiengesellschaft, Munich (DE)

(*) Notice: Subject to any disclaimer, the term of this patent is extended or adjusted under 35 U.S.C. 154(b) by 641 days.

(21) Appl. No.: 13/933,176

(22) Filed: Jul. 2, 2013

(65) Prior Publication Data

US 2014/0107852 A1 Apr. 17, 2014

Related U.S. Application Data

(60) Provisional application No. 61/712,344, filed on Oct. 11, 2012.

(51) Int. Cl.
*G05D 3/12* (2006.01)
*H02J 4/00* (2006.01)
(Continued)

(52) U.S. Cl.
CPC ............... *H02J 4/00* (2013.01); *H02J 3/006* (2013.01); *H02J 3/14* (2013.01); *H02J 3/06* (2013.01);
(Continued)

(58) Field of Classification Search
CPC ............... H02J 4/00; H02J 3/14; H02J 3/006; H02J 13/0079; H02J 13/0075; H02J 13/0006; H02J 2003/007; H02J 3/06; H02J 2003/001; Y04S 40/22; Y04S 20/222; Y02E 60/76; Y02B 70/3225
(Continued)

(56) References Cited

U.S. PATENT DOCUMENTS

| 8,121,740 B2 * | 2/2012 | Yang ..................... H02J 13/00 700/283 |
| 2004/0088083 A1 * | 5/2004 | Davis ..................... H02J 3/14 700/295 |

(Continued)

FOREIGN PATENT DOCUMENTS

| EP | 2466714 A2 | 6/2012 |
| EP | 2575230 A2 | 4/2013 |

(Continued)

OTHER PUBLICATIONS

Allen et al., "Flexible High-Speed Load Shedding Using a Crosspoint Switch", IEEE, 2006, pp. 501-509.*

(Continued)

*Primary Examiner* — Robert Fennema
*Assistant Examiner* — Thomas Stevens (57) ABSTRACT

A utility network powered by a power source has a plurality of substations enabled to power electrical equipment in a participant site. At least one substation is disconnected from the utility network and is to be reconnected via a substation with a power constraint. A processor determines how much power should be shed in a participant site of the substation with the power constraint to allow reconnection of the substation that is disconnected. The processor initiates a Demand Response signal to power consuming equipment in the participant site of the substation with the power constraint to shed power. After shedding power based on the Demand Response signal, the substation that was disconnected is connected to the utility network by closing a switch.

20 Claims, 6 Drawing Sheets

(51) Int. Cl.
*H02J 3/00* (2006.01)
*H02J 3/14* (2006.01)
*G01R 31/00* (2006.01)
*H02J 3/06* (2006.01)
*H02J 13/00* (2006.01)

(52) U.S. Cl.
CPC ......... *H02J 13/0006* (2013.01); *H02J 13/0075* (2013.01); *H02J 13/0079* (2013.01); *H02J 2003/001* (2013.01); *H02J 2003/007* (2013.01); *Y02B 70/3225* (2013.01); *Y02E 60/76* (2013.01); *Y04S 20/222* (2013.01); *Y04S 40/22* (2013.01)

(58) Field of Classification Search
USPC .......................................... 702/58; 700/295
See application file for complete search history.

(56) References Cited

U.S. PATENT DOCUMENTS

| 2008/0183339 | A1* | 7/2008 | Vaswani | G01D 4/004 700/297 |
| 2008/0272934 | A1* | 11/2008 | Wang | H02J 3/14 340/870.11 |
| 2009/0281674 | A1* | 11/2009 | Taft | G01D 4/002 700/286 |
| 2010/0094573 | A1 | 4/2010 | Yang et al. | |
| 2011/0106328 | A1* | 5/2011 | Zhou | G05B 13/024 700/291 |
| 2013/0138260 | A1* | 5/2013 | Divan | G05B 13/02 700/298 |

FOREIGN PATENT DOCUMENTS

| WO | 2007065135 | A2 | 6/2007 |
| WO | 2007065135 | A3 | 6/2007 |
| WO | 2010078132 | A2 | 7/2010 |
| WO | 2010078132 | A3 | 7/2010 |

OTHER PUBLICATIONS

Mohagheghi et al., "Demand Response Architecture" IEEE, 2010, pp. 502-506.*
The Power Supply Restoration Benchmark for ICKEPS-07, Sylvie Thiebaux, 2007, 6 pages.
Strategic Planning for Power System Restoration, Carleton Coffrin, Pascal Van Hentenryck, and Russell Bent, Apr. 2011, 8 pages.

* cited by examiner

USE OF DEMAND RESPONSE TO ENABLE IMPROVED POWER SUPPLY RESTORATION PLANNING

The present application claims priority to and the benefit of U.S. Provisional Patent Application Ser. No. 61/712,344 filed on Oct. 11, 2012 which is incorporated herein by reference in its entirety.

TECHNICAL FIELD

The present invention is related to systems and methods for improving outage management in a utility. More in particular it relates to methods and systems for improving outage management by applying one or more Demand Response features in a smart grid.

BACKGROUND

In electrical grids, a power supply fault triggering a circuit breaker to open must first be isolated through the identification of the relevant switching devices and the systematic opening of those devices. Only once the fault is isolated, can electricity supply be restored to the remaining customers or equipment electrically connected to the feeder. This is done through the closing of switching devices that isolate the faulty feeder from another feeder, effectively making a portion of the faulted feeder an extension of the good feeder. Complicating this process is the need to ensure that the power consumed by customers on a given segment of the feeder does not exceed the maximum capacity of the feeder.

Determining a sequence of switching devices to be opened or closed is the domain of Outage Management Systems under guidance by utility operators. The process to determine that sequence is non-trivial and is performed through the sub-field of artificial intelligence systems known as automated planning Current Outage Management Systems define the planning problem in terms of two potential actions that can be applied to any switching device in the grid—to open the device (preventing electrical current flow), or to close the device (allowing electrical current flow). The planner uses heuristics based on the power consumed by customers on the feeder and the maximum supported power on the feeder to decide which devices to open or close. This is the extent of the power restoration benchmark used in biennial automated planning competitions conducted as the "International Competition on Knowledge Engineering for Planning and Scheduling" or ICKEPS competitions. Search algorithms to solve this benchmark area an active area of research. The complexity of the search is at least O(n log n) which implies that a human taking 5 minutes to evaluate each state of a search for an outage covering 1000 locations could expect to complete their analysis in 24 complete days.

Different restoration search programs exist. These analyze a grid, its constraints and the known outages. Based on the constraints, recommendations are made for instance on routing decisions to restore areas and optimized for instances for the greatest number of restored customers per restoration action. As discussed earlier, while the routing optimization is known, DR methods are currently not part of these analyses. One restoration routing method is disclosed in "Strategic Planning for Power System Restoration" by Coffrin et al. p. 180-187, Proceedings of the International Conference on Vulnerability and Risk Analysis and Management (ICVRAM 2011) and the International Symposium on Uncertainty Modeling and Analysis (ISUMA 2011), held in Hyattsville, Md., Apr. 11-13, 2011, which is incorporated herein by reference in its entirety.

In a so-called Smart Grid, the electrical grid gains the ability to have two-way communication between customers on the line and the electrical distribution utility company. This provides several important features to the Outage Management System, among which are: 1) accurate power consumption measurements of customers on the line, and 2) the ability to modify the power consumption of customers on the line by issuing what are known as Demand Response events.

One known application of Demand Response is to prevent outages by load management as for instance described in a Siemens® Sell Sheet on its Demand Response Management System dated Oct. 18, 2012 of Siemens Industry, Inc. of Minnetonka, Minn.

It is believed that currently no Demand Response solutions exist to restore power to consumers who have lost power and restoration is hampered by capacity issues in grid equipment as happened in the Indian Point Unit 3 Nuclear power shutdown of 2012.

How Outages are Handled Currently

Power companies employ a wide range of tactics to handle an outage situation such as those caused by large storms. Depending on the size of the storm, a company may bring in restoration crews from surrounding areas. Prior to Hurricane Sandy, PSE&G requested more than 1300 linemen from other areas. Afterwards, there were more than 60,000 linemen and utility staff and an extra 3000 bucket trucks, involved in restoring power to 8.5M homes (2M of which were PSE&G customers).

Protection devices shut down power by separating circuits to prevent further damage, and restoration then involves identifying the damage then repairing the damage and then restoring power. In this process, telemetry is processed; and work crews are dispatched to locations of known damage or outage.

Managing so many resources requires talented dedicated teams of operators and human communication between control centers. Some Outage Management System software helps with customer communications, and some help with deploying work crews. However, ultimately operators must apply their expertise to prioritize locations.

Reduced Power is a Real Scenario

During Sandy, Entergy in NYC had to shut down Unit 3 at Indian Point Energy Center removing 1041 MW from the grid. Unit 3 serves a million customers. In a robust electrical system, it is better to serve less power to more customers than create a blackout. Substations that have multiple incoming feeders are common.

A substation that loses power on one feeder must transfer load to the feeders that are still energized. This can be done remotely if telemetry is available and no repairs are required. However, if the combined load will be excessive, the transfer cannot be accomplished.

Demand Response is a Real Capability

The demand response capability can reduce the load consumed by energized consumers. Currently most demand response participants operate in a manual mode whereby they may be informed by telephone that they need to power down certain devices. The FERC national action plan for Demand Response includes language encouraging the deployment of automated response systems. It is expected that automated DR systems will be deployed widespread in the near future.

Demand Response is Currently not used in Operator Based Outage Restoration Today Demand Response is not typically used in developing a restoration strategy for work crews during an outage, to determine how to bring people back online, instead it is used in grid stabilization—simply ensuring that supply meets demand. (FP&L 2008). Operators must still carefully determine a restoration plan. The current manual process requires the operator to use his or her judgment to determine which sites to send work crews to identify or repair damage. This is a complicated procedure due to several factors, including (a) The analysis of supply and prioritization of types of customer and demand served by each outage area; (b) Distances to each outage; (c) There may not be enough work crews available to fix all problems at the same time; (d) It is not efficient to have work crews available at all times for the maximum number of simultaneous outages; (e) Cascading outages prevent repairs upstream until downstream repairs are complete; and (f) Current work crew locations.

To demonstrate the complexity of this process, one can equate solving this problem to a weighted graph search, in which the operator must analyze both the structure of the network and establish goals (weights) for repairing outage locations. This is a typical search problem on a weighted undirected connected graph for which search algorithms exist with O(E log V) time complexity; here E is the number of transmission lines, and V is the number of outage locations. This is a minimum, but the fact that there are multiple work crews, and dependencies between outage locations complicate the search process.

For small grid networks of outages, the search can be executed by a human in a reasonable time. Due to the minimum O(n log n) complexity, the problem scales non-linearly; for example at 1000 outage locations, there are 6908 steps to complete the search. At 5 minutes to analyze each outage location, the search would take 24, 24-hour days to complete, which is clearly not acceptable in addressing real-life outage situations.

Thus outage restoration is best served by heuristic search software that models the structure of the electrical network and can perform this analysis in real time. Furthermore if the operator wishes to apply the demand response methodology described herein, then the operator must at each solution communicate with the selected consumers for power restoration. As discussed above, the number of consumers could easily be in the 1000's. For example, a 10 kw drop on a 1 MW house would require 100 demand response notifications to be communicated to end users, before 1 additional house can be brought online (1 customer for 100 1% drops). Clearly a 10 MW drop on a 200 MW industrial site would be another matter (10 customers could be brought online for a 5% drop).

Accordingly, novel and improved methods and systems are required to apply Demand Response methods for restoring power in parts of a utility grid with capacity constrained equipment after a power outage.

SUMMARY

In accordance with an aspect of the present invention, a method is provided for controlling a utility network with a power source applying power to a substation, which supplies power to a first participant site connected to the substation and is enabled to supply power to a disconnected substation that feeds a second participant site when a switch is closed, the switch being connected to the disconnected substation, comprising a processor determining an amount of power required to be delivered to the disconnected substation when the switch is closed, the processor determining a power capacity constraint of the substation, the processor determining an amount of power being fed to the first participant site prior to closing the switch, the processor determining a reduced amount of power for the first participant site to meet the power capacity constraint of the substation when the switch is closed, the processor providing a Demand Response signal to a metered power consumer in the first participant site to contribute to reducing power consumption to meet the reduced amount of power and the processor providing an instruction to close the switch and changing a status of the disconnected station to being connected.

In accordance with another aspect of the present invention, a method is provided, wherein the utility network has at least 50 substations.

In accordance with yet another aspect of the present invention, a method is provided, wherein a consumer in the first participant site has opted in to shed power based on a Demand Response event.

In accordance with yet another aspect of the present invention, a method is provided, further comprising the processor applying a planning program to determine a viable route to connect the disconnected substation to the power source.

In accordance with yet another aspect of the present invention, a method is provided, wherein at least two connected substations, each supporting at least one Participant Site, are in a restoring route of the disconnected substation.

In accordance with yet another aspect of the present invention, a method is provided, wherein Participant Sites of at least two substations have to shed power based on a Demand Response event to enable changing the status of the disconnected substation.

In accordance with yet another aspect of the present invention, a method is provided, further comprising determining by the processor that the second participant site includes one or more devices that are enabled to be switched off based on a Demand Response signal, the processor selectively connecting the second participant site to the substation and the processor shedding at least one device in the one or more devices in the second participant site based on the Demand Response signal.

In accordance with yet another aspect of the present invention, a method is provided, wherein a number of devices that is switched off by the Demand Response signal depends on a severity of an outage.

In accordance with yet another aspect of the present invention, a method is provided, wherein at least two substations in the utility network were disconnected and are reconnected.

In accordance with yet another aspect of the present invention, a method is provided, further comprising a communication network enabled to report a status of equipment in the utility network to a server.

In accordance with a further aspect of the present invention, a system is provided to control a utility network with a power source applying power to a substation, which supplies power to a first participant site connected to the substation and is enabled to supply power to a disconnected substation that feeds a second participant site when a switch is closed, the switch being connected to the disconnected substation, comprising a memory enabled to store data and instructions, a processor enabled to retrieve instructions from the memory and to execute the instructions to perform the steps determining a status of the utility network, determining an amount of power required to be delivered to the disconnected substation when the switch is closed, determining a power capacity constraint of the substation, determining an amount of power being fed to the first participant site prior to closing the switch, determining a reduced amount of power for the first participant site to meet the power capacity constraint of the substation when the switch is closed, providing a Demand Response signal to a metered power consumer in the first participant site which contributes to reducing power consumption to meet the reduced amount of power and providing an instruction to close the switch and changing a status of the disconnected station to being connected.

In accordance with yet a further aspect of the present invention, a system is provided, wherein the utility network has at least 50 substations.

In accordance with yet a further aspect of the present invention, a system is provided, wherein a consumer in the first participant site has opted in to shed power based on a Demand Response event.

In accordance with yet a further aspect of the present invention, a system is provided, further comprising the processor applying a planning program to determine a viable route to connect the disconnected substation to the power source.

In accordance with yet a further aspect of the present invention, a system is provided, wherein at least two connected substations, each supporting at least one Participant Site, are in a restoring route of the disconnected substation.

In accordance with yet a further aspect of the present invention, a system is provided, wherein Participant Sites of the at least two substations have to shed power based on a Demand Response event to enable changing the status of the disconnected substation.

In accordance with yet a further aspect of the present invention, a system is provided, wherein the processor is further enabled to perform the steps determining that the second participant site includes one or more devices that are enabled to be switched off based on a Demand Response signal, selectively connecting the second participant site to the substation and shedding at least one device in the one or more devices in the second participant site based on the Demand Response signal.

In accordance with yet a further aspect of the present invention, a system is provided, wherein a number of devices that is switched off by the Demand Response signal depends on a severity of an outage.

In accordance with yet a further aspect of the present invention, a system is provided, wherein at least two substations in the utility network are disconnected and are reconnected.

In accordance with yet a further aspect of the present invention, a system is provided, further comprising a communication network enabled to report a status of equipment in the utility network to a server.

In accordance with yet aspect of the present invention, a method is provided for controlling a utility network with a power source applying power via a feeder for a substation, which supplies power to a first participant site connected to the substation and is enabled to supply power to a disconnected substation that supplies a second participant site when a switch is closed, the switch being connected to the disconnected substation, comprising: a processor determining an amount of power required to be delivered to the disconnected substation when the switch is closed, the processor determining a power capacity constraint of the substation, the processor determining an amount of power being fed to the first participant site prior to closing the switch, the processor determining a reduced amount of power for the first participant site to meet the power capacity constraint of the substation when the switch is closed, the processor providing a Demand Response signal to a metered power consumer in the first participant site to contribute to reducing power consumption to meet the reduced amount of power and the processor providing an instruction to close the switch and changing a status of the disconnected station to being connected.

In accordance with yet aspect of the present invention, a method is provided for the processor determining a power capacity constraint of the feeder and the substation and the processor determining a reduced amount of power for the first participant site to meet the power capacity constraint of the feeder and substation when the switch is closed.

DESCRIPTION

Demand Response is a concept that is part of Smart Grid technology, which can be applied to reduce power consumption by individual devices or even disconnect a device from the grid that has been opted in to this aspect. The power reduction or shedding as well as voluntary disconnection takes place based on a Demand Response signal sent to a switch in the device, for instance a reduce-power signal or a switch-off signal. Another Demand Response signal may be a switch-on signal or a restore signal. A Demand Response signal may for instance control a thermostat at a home with an Air Conditioning unit. An explanation of the use of Demand Response in switching on or off of devices is provided in U.S. Patent Application Publication Ser. No. 20120004786 to Lo et al. published on Jan. 5, 2012 entitled PLC FUNCTION BLOCK FOR AUTOMATED DEMAND RESPONSE INTEGRATION, which is incorporated herein by reference. A switch-off signal can be generated based on what is called a Demand Response event that necessitates a switch-off signal.

The ability to apply a Demand Response event is a novel option that automated planners may use in power supply restoration after an outage and in situations wherein capacity constrained equipment needs to be considered. By minimizing electrical power consumed by customers on the line, the outage is made easier to solve, since a smaller feeder may become suitable for use in the restoration of power to customers.

Smart Grid Topology Discussion

Figure 1:
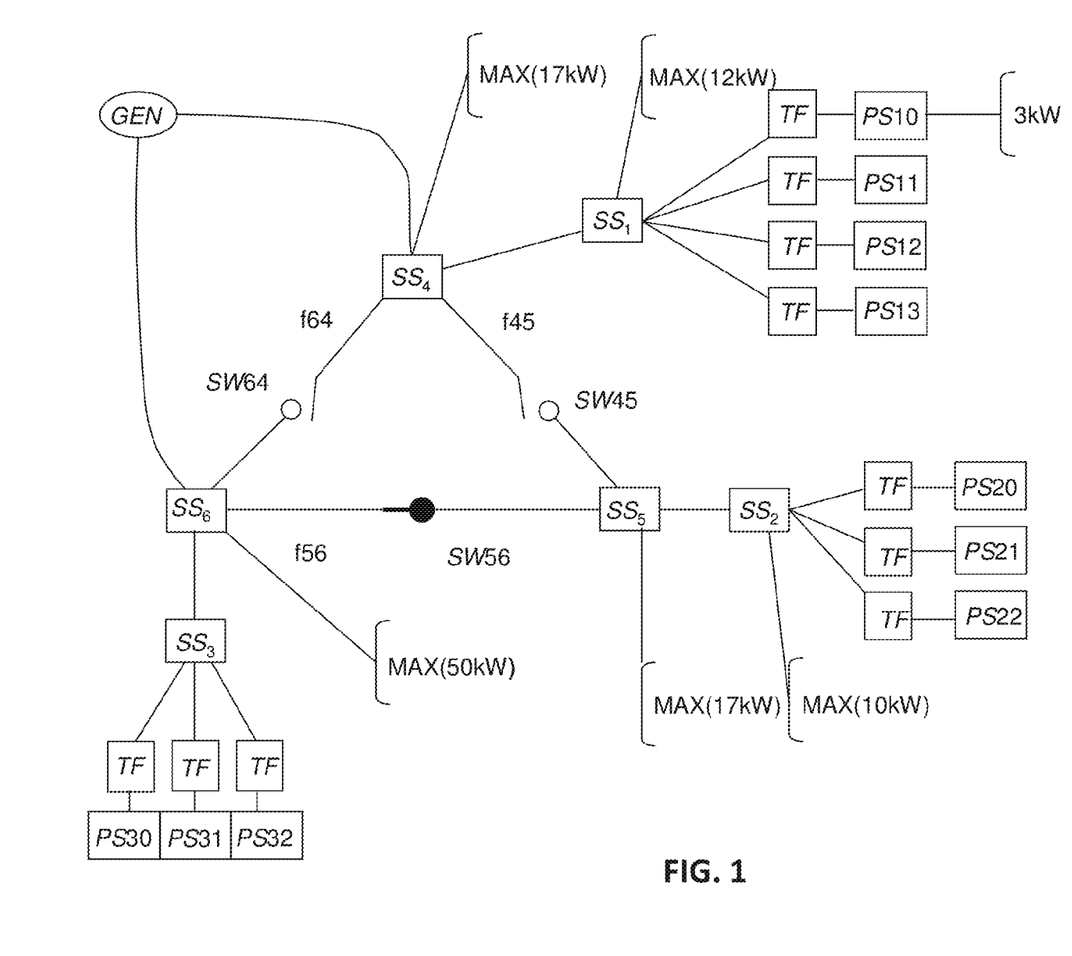
FIGS. 1, 2 and 3 illustrate in diagram an electrical grid in accordance with one or more aspects of the present invention.

FIG. 1 illustrates a topology of a grid in diagram. Defined participant site $PS_{ij}$ and participant j are connected to substation i. TFs are transformers/protection devices that are otherwise not referenced in herein. Substations $SS_4$, $SS_5$ and $SS_6$ constitute a second tier set of substations connected to generation capacity. Generation capacity GEN drives loads via substation $SS_4$ and $SS_6$.

Substations $SS_4$, $SS_5$ and $SS_6$ are connected in a loop by 3 feeder lines. Feeder mn is a connection between Substation m and Substation n. Each feeder has a switch that can be opened or closed remotely. The switch is defined as switch mn for feeder mn.

Substation 5 is driven from substation 6 and not directly from generation capacity. Relations between elements in the grid can be described by the following Power Equations.

$P_{ps}(ij)$=Instantaneous draw from site $ij$ $P_{max}(i)$=maximum instantaneous draw at Substation $I$ $P_{ss}(i)$=Instantaneous draw at Substation $i$, in kW Grid Constraints are:

$$P_i \leq P_{max}(i) \quad (1)$$

$$P_i = \Sigma_j PS_{ij} + \Sigma_{k=1}^{k \neq i} P_{ss}(k) * closed(i,k), \exists f_{ik} \quad (2)$$

Or at any given moment, the power draw at any given substation must not exceed its rated capacity.

In an illustrative example herein, wherein losses are ignored and the grid has been simplified, the following expressions apply:

$$P_{ss}(4) = P_{ss}(1)$$

$$P_{ss}(5) = P_{ss}(2)$$

$$P_{ss}(6) = P_{ss}(3)$$

In accordance with one aspect of the present invention, a Participant Site herein is preferably a site or a geographic area with one or more metered electricity consumers. In accordance with another aspect of the present invention, a Participant Site herein is a site or a geographic area with one or more metered electricity consumers connected to a substation. In accordance with yet another aspect of the present invention, a Participant Site herein is a site or a geographic area with one or more metered electricity consumers connected to a substation via a transformer. In accordance with yet another aspect of the present invention, a Participant Site herein is a site or a geographic area with one or more metered electricity consumers connected to a substation via a transformer which can be selectively connected or disconnected by a switch that is remotely controlled.

Outage Scenario

In this example it will be considered what the effects are of power outages on the sample grid and what an outage restoration plan that would restore optimal power looks like.

Figure 2:
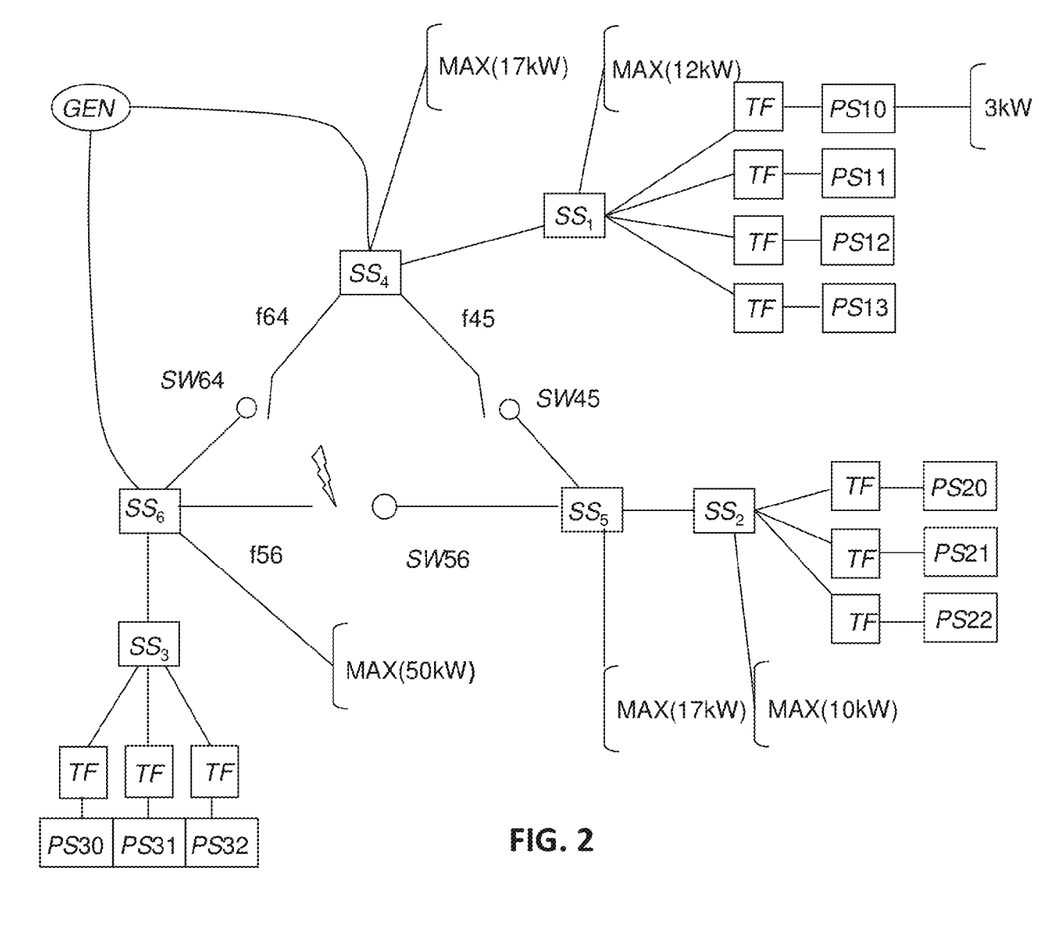

Clearly, a fault on $f_{56}$ while switch$_{64}$ and switch$_{45}$ is open will result in $SS_5$ being isolated from the grid. This fault situation is illustrated in FIG. 2.

The outage planner must decide on how to restore power to $SS_5$. In the traditional approach, an analysis of the affected customers and local conditions will be made to decide which customers to bring back online first. However, all of the affected customers in this example are behind $SS_2$ which has been isolated by the fault.

Restoring connectivity to the grid is simply a matter of closing the protection device on $f_{45}$, switch$_{45}$, however this cannot be done because the grid constraint identified above will be violated:

$$P_{max}(SS_4) = 17 \text{ kW}.$$

From (1), the power at $SS_4$=the power at $SS_1$, equal to the sum of all participants connected to $SS_1$ as illustrated in the following table.

| Connected Substation | Participant Site | Power Draw | Running total |
|---|---|---|---|
| 1 | 0 | 3 | 3 |
| 1 | 1 | 3 | 6 |
| 1 | 2 | 3 | 9 |
| 1 | 3 | 3 | 12 |

If switch$_{45}$ is closed the draw from participant sites on $SS_5$ to $SS_4$ have to be added.

| Connected Substation | Participant Site | Power Draw | Running total |
|---|---|---|---|
| 2 | 0 | 3 | 15 |
| 2 | 1 | 3 | 18 |
| 2 | 2 | 3 | 21 |

This result violates the constraint (1).

In a more fully fledged scenario, each feeder line has its own capacity constraints, adding additional constraints to the problem.

The term feeder herein refers to the supply cables going in to a substation, and by extension those same cables that are coming out of a substation because they are going to another substation. There can be multiple supply feeders for a substation. The power capacity constraints thus apply to the capacity of the substation and its equipment and to its feeder or feeders or feeder cables. In accordance with one aspect of the present invention the power handling capacity of a substation equipment is considered to be the constraint. In accordance with another aspect of the present invention the power handling capacity of a feeder of a substation is considered to be the constraint. In accordance with yet another aspect of the present invention the power handling capacity of the substation equipment in combination with one or more feeders is considered to be the constraint.

In accordance with an aspect of the present invention a route through a substation includes an entry feeding cable, the substation equipment and the exit feeder cable. The constraint in that route is thus the maximum power that can be handled by one of the feeder cables or the substation. For instance, if the substation can handle 12 kW and the entry and exit feeder cables can handle 18 kW and 15 kW, respectively, then the constraint of the route formed by the feeder cables and substation is 12 kW. If the substation can handle 12 kW, the entry cable can handle 18 kW, but one exit feeder cable can handle 10 kW then the constraint of the route formed by the substation and the feeder cables is 10 kW.

Traditional Solutions

Outage planners utilizing advanced software techniques help an operator to decide on the sequence of operations necessary to restore power. In this case, outage planning software will suggest and track the utilities efforts to restore power, potentially also handling incoming outage notifications from consumers.

With a single isolated fault as described above, the choice of where the utility should send a team is easy. However, power will not be restored until such time as the physical fault on feeder$_{56}$ is resolved.

Clearly the time to restore the power to disconnected segment of the grid is equal to the time it takes the repair team to fix the fault.

Technical Improvement

Using the techniques shown in the next two sections, power can be restored to the disconnected segment before the fault is physically repaired, and the techniques relies only on existing links and protection devices. A demand response system must be in place, although no control capability of the segments running without power is required.

Using Demand Response Events

Demand Response systems allow consumers or customers to opt-in to certain load shed events to reduce their electricity consumption in exchange for incentives. This requires that the utility can control devices at the site locations—turning them off and back on after the event has passed.

There are many reasons for executing events against customers, market price fluctuations have the most direct benefit to the customer, but grid stabilization is another reason to execute an event.

In an emergency situation, if the consumption of a set of participant sites can be reduced to a certain lower guaranteed level, then more capacity is available at the substations serving those participant sites.

In the sample grid of FIGS. 1 and 2 it is assumed that $SS_1$ serves a set of consumers who are running Demand Response systems in exchange for some incentive. It is also assumed the customers have pre-opted in to emergency events if that is required. In one embodiment of the present invention this group is an industrial or commercial site such as a shopping mall. In one embodiment of the present invention the outage is occurring during a winter night and the shopping mall has significant power consumption for lighting alone.

In this situation it may be possible to turn off the lights at the sites by issuing a demand response event. Perhaps the 3 kW consumption is reduced to 2 kW per-site by the event. The calculations thus follow:

| Connected Substation | Participant Site | Power Draw | Running total |
| --- | --- | --- | --- |
| 1 | 0 | 2 | 2 |
| 1 | 1 | 2 | 4 |
| 1 | 2 | 2 | 6 |
| 1 | 3 | 2 | 8 |

If $switch_{45}$ is closed:

| Connected Substation | Participant Site | Power Draw | Running total |
| --- | --- | --- | --- |
| 2 | 0 | 3 | 11 |
| 2 | 1 | 3 | 14 |
| 2 | 2 | 3 | 17 |

Clearly there is no way to control the consumption at a site for which power has been lost, so a demand response event must create enough available capacity to handle the restored loads. In this worked example, it can be seen that the grid constraint (1) has not been violated, and grid stability is thus assured.

The term substation is used herein. A substation in one embodiment of the present invention is any station in a grid involved in transmission and/or distribution of electricity. A substation in one embodiment of the present invention is any station in a grid involved in transmission and/or distribution of electricity that is enabled to be disconnected individually from the grid.

In one embodiment of the present invention, a substation constraint as illustrated above is derived from the maximum handling capacity of the substation equipment.

In one embodiment of the present invention, the substation equipment includes one or more feeder cables.

A substation in one embodiment of the present invention, is any station in a grid involved in transmission and/or distribution of electricity that is not a transformer without a switch or member(s) of a participant site. Transformers and participant sites are disconnected from the grid when the station they are connected to is disconnected from the grid.

Figure 3:
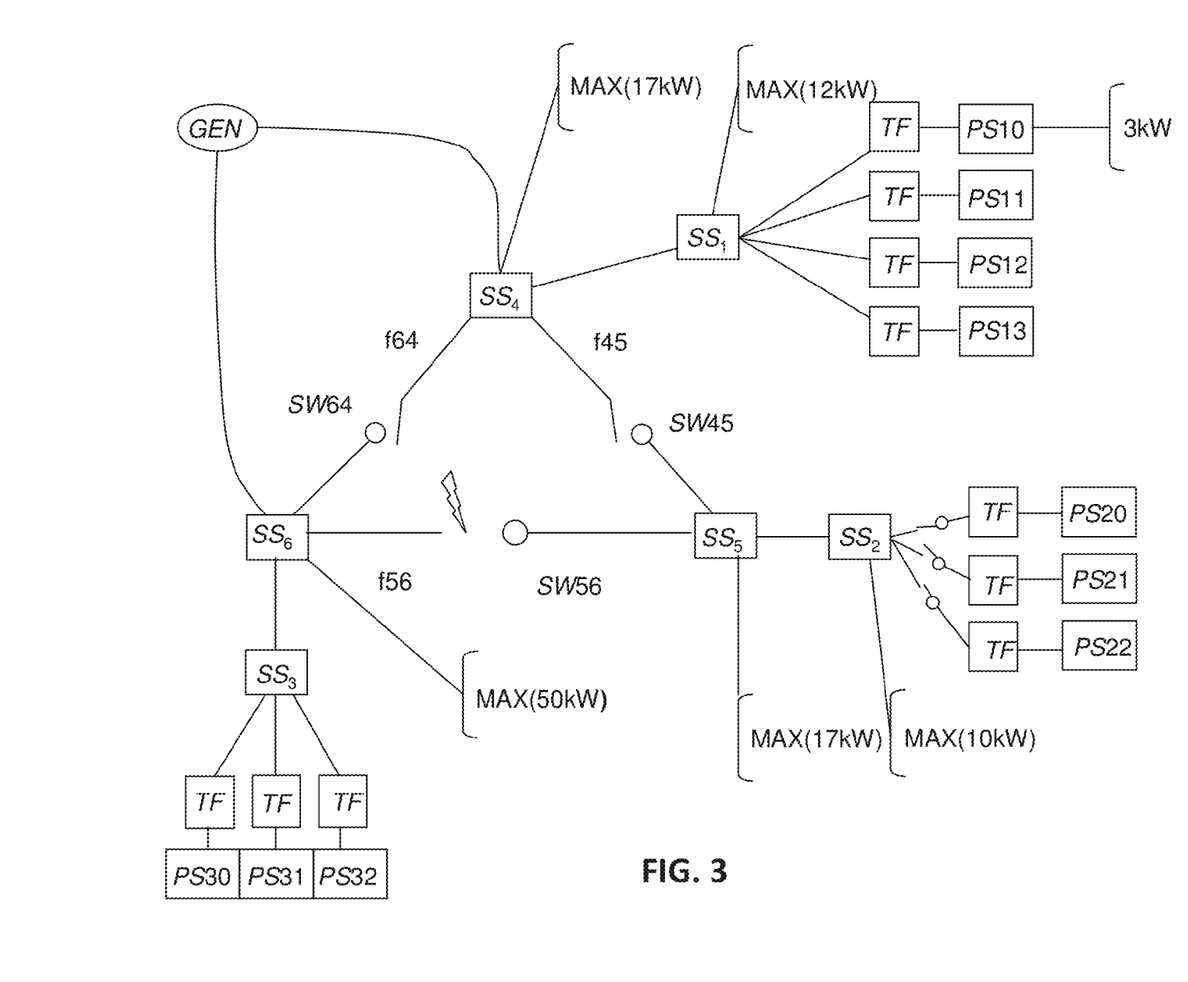

In one embodiment of the present invention, a transformer that services a participant site is also a station that can be individually connected or disconnected from the grid. This is illustrated in FIG. 3, wherein the transformers TF can be individually disconnected from substation $SS_2$ and thus participants sites $PS_{20}$, $PS_{21}$ and $PS_{22}$ are enabled to be individually disconnected and reconnected. It shows $PS_{21}$ and $PS_{22}$ as being selectively disconnected and $PS_{20}$ as being selectively connected. The participant site $PS_{20}$ receives a DR signal and DR participants will shed power. After power has been shed, for instance $PS_{21}$ may be selectively connected and also receives a DR signal. Etc.

For instance, in the scenario as illustrated in FIG. 2, the system is enabled to shed 1 kW in consumption of $PS_{10}$, $PS_{11}$ and $PS_{12}$. However, $PS_{13}$ remains at 3 kW. As a consequence the total power demand at SS4 may be 9 kW from $SS_2$ and 9 kW from $SS_1$ requiring a demand of 18 kW from SS4, which violates its connection constraint of 17 kW.

It was already observed that it is impossible to control power consumption at a down site. However, one may have information stored of participant sites that have significantly opted in to Demand Response. For instance, a computer can analyze participant sites that are currently off-line for Demand Response opt-in. It is noted that only 1 kW of additional power shedding is required to reconnect $SS_2$. It is also noted that the processor can bring up at maximum two of the three participant sites of $SS_2$ without violating the 17 kW constraint of $SS_4$. For instance $PS_{20}$ has Demand Response participants that can shed 1 kW. In accordance with an aspect of the present invention the processor connects $PS_{20}$ to $SS_2$ leaving $PS_{21}$ and $PS_{22}$ disconnected. The addition of 3 kW of power consumption brings total demand at $SS_2$ at 13 kW well below the 17 kW limit. A Demand Response signal is issued which reduces the consumption at $PS_{20}$ to 2 kW. This allows in a next step to safely reconnect $PS_{21}$ and $PS_{22}$.

In accordance with an aspect of the present invention, a processor issues a Demand Respond signal to shed power at one or more Participant Sites based on an analysis of a status of a grid including at least one disconnected substation to quickly and safely restore power to one or more Participant Sites that are enabled to be fed by the disconnected substation when connected.

Automating the Demand Response Option in Outage Planning

Some outage planning tools use advanced "artificial intelligence" planning software. The power supply restoration benchmark from ICKEPS-07 has been used to rate these and other planning agents. In this benchmark problem there are two potential actions that can be applied to the current state of the grid—to open a switching device or to close a switching device.

Planning programs targeting this restoration benchmark therefore do not incorporate Demand Response as an option in the planning process. As has been demonstrated herein, in the absence of smart grid technologies, at least one case exists where power cannot be restored until the physical fault is resolved, due to capacity constraints, and that this can be handled by judicious use of demand response events.

Therefore, the addition of a demand response action as a capability of a power supply restoration planning agent will allow agents to solve certain power supply restoration problems more optimally.

Utilities

It is expected that utilities will benefit from this technology by adding the capability to any existing outage restoration tool that provides advanced planning agents to solve this problem associated with constraints based re-connection.

It is believed that no advanced outage restoration planning tools exists that incorporate Demand Response events as a potential outage restoration action as provided herein in accordance with one or more aspects of the present invention is currently available.

Implementation Steps

In accordance with an aspect of the present invention, the steps as provided herein to lower power consumption by Demand Response in order to meet a power constraint of a station to enable reconnection of a disconnected station operate on a Smart Grid with Demand Response events enabled. The above provided steps in one embodiment of the present invention are implemented in a computer program operated on a processor based machine as a power restoration tool. This tool in one embodiment of the present invention uses one or more components from the open source JBoss Drools Business Logic integration tools. One useful component is the Drools automated planner now renamed Optaplanner or any other general purpose planning system in conjunction with an open grid description language to create an more flexible and powerful power outage management system. Such a computer program will assist the utility operators to more quickly and safely restore power under distributed constraints using demand response events on various grid configurations with Demand Response.

Such programs may also be known as scheduling programs and have for instance as one capability to analyze a network with nodes and connections or edges and to determine a critical path between nodes based on predefined constraints.

It is of course well known that an electricity grid has many substations that are interconnected, in fact with many more substations than illustrated in FIG. 1. It is also known that there are different possible switching configurations that can and should be considered in reconnecting a substation that was disconnected from power due to for instance a fault on a line. In one embodiment of the present invention, the restoration method using Demand Response provided herein in accordance with an aspect of the present invention is applied to a grid with at least 6 substations and at least two possible routings to connect a substation to a power source. The ability to transmit Demand Response signals controlled by a processor and generated on a processor based assessment of a status of the grid, even in a relatively small grid allows for almost immediate restoration of power of a disconnected substation. One would not be able to do this manually. In fact, manual restoration without the insight and control provided by aspects of the present invention in some cases may lead to failure of restoration and even additional damage to the infrastructure. Additionally, trial of restoration without proper planning or control over aspects of the grid, as is enabled through aspects of the present invention, has in some cases led to a cascading failure of larger parts of the grid.

The complexity of restoration of a substation increases substantially with the number of substations and consequently with an increased number of possible reconnection routes of a disconnected substation. In one embodiment of the present invention, the restoration method using Demand Response provided herein in accordance with an aspect of the present invention is applied to a grid with at least 10 substations and in accordance with another aspect of the present invention is applied to a grid with at least at least 25 substations and in accordance with yet another aspect of the present invention is applied to a grid with at least at least 50 substations and in accordance with yet another aspect of the present invention is applied to a grid with at least at least 100 substations. It is believed that restoration in a grid of at least 10 substations already is a challenge to a human operator and cannot be quickly and efficiently performed by a human operator under pressure to manage aspects a grid with one or more outages. With possibly 1000s and most certainly dozens or 100s of outages, it becomes impossible for a human operator to assess all possible steps to restore and/or to issue DR messages to substations and end-users able to shed or disconnect power. A grid with outages and at least 25 substations with different possible routings becomes very difficult if not impossible to be handled strictly by a human operator. Accordingly, a processor or computer based implementation of the methods provided herein in accordance with various aspects of the present invention are required.

In one embodiment of the present invention, the restoration method using Demand Response provided herein an accordance with an aspect of the present invention is applied to a grid with at least 50 substations and more than 4 reconnection routes.

Figure 4:
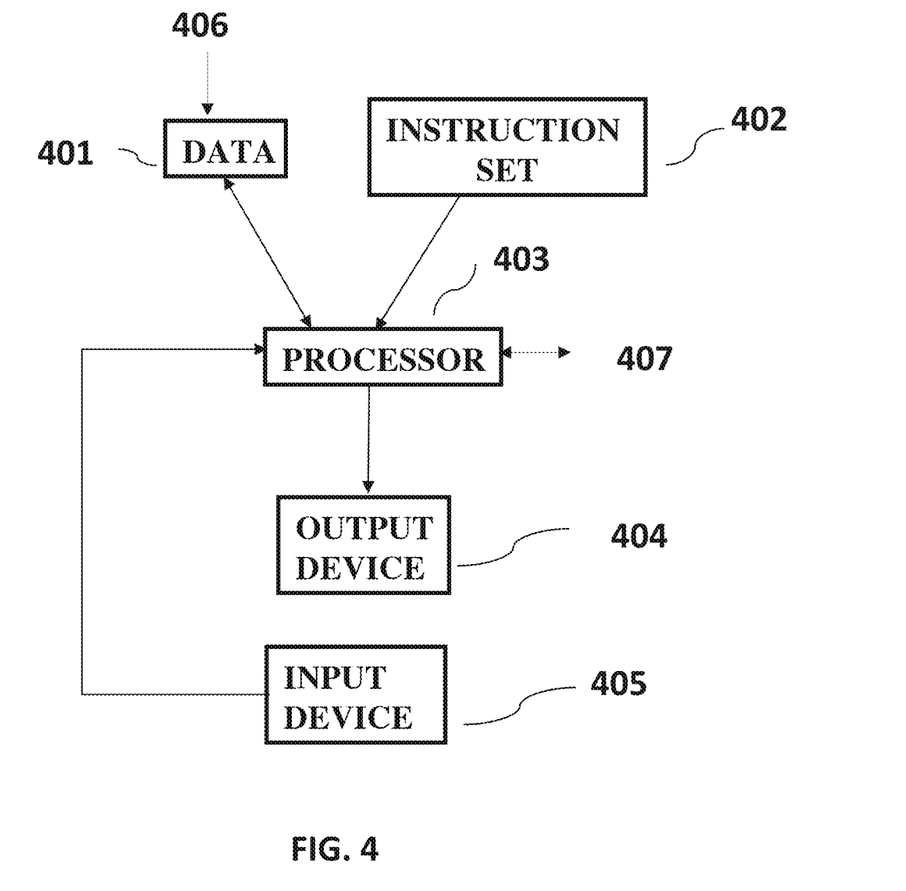
FIG. 4 illustrates a processor based system in accordance with one or more aspects of the present invention.

The methods as provided herein are, in one embodiment of the present invention, implemented on a system or a computer device. Thus, steps described herein are implemented on a processor in a system, as shown in FIG. 4. A system illustrated in FIG. 4 and as provided herein is enabled for receiving, processing and generating data. The system is provided with data that can be stored on a memory 401. Data may be obtained from an input device. Data may be provided on an input 406. Such data may be data provided by sensors in the utility grid or from a data base or any other source that would contribute to restoring connection. The processor is also provided or programmed with an instruction set or program executing the methods of the present invention that is stored on a memory 402 and is provided to the processor 403, which executes the instructions of 402 to process the data from 401. Data, such signals related to a Data Response signal or any other data provided by the processor can be outputted on an output device 404, which may be a display to display images or data or a data storage device. The processor also has a communication channel 407 to receive external data from a communication device and to transmit data to an external device, for instance to a switch or to a metered device that has been opted in to a DR (Demand Response) system and signals. The system in one embodiment of the present invention has an input device 1105, which may include a keyboard, a mouse, a pointing device, or any other device that can generate data to be provided to processor 403.

The processor can be dedicated or application specific hardware or circuitry. However, the processor can also be a general CPU or any other computing device that can execute the instructions of 402. Accordingly, the system as illustrated in FIG. 4 provides a system for processing data and is enabled to execute the steps of the methods as provided herein in accordance with one or more aspects of the present invention.

Figure 5:
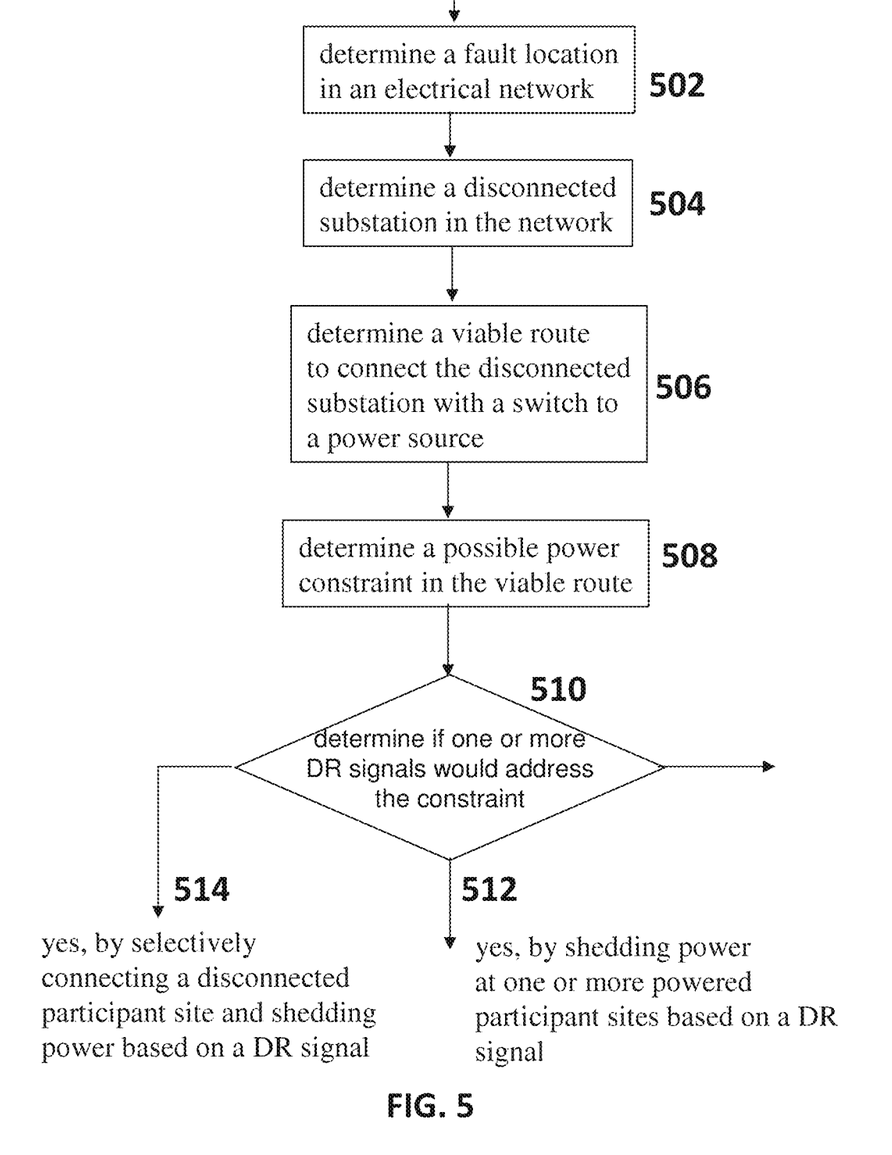
FIG. 5 illustrates steps of a method that is to be performed by a processor in accordance with various aspects of the present invention.

Certain steps of the methods provided herein in accordance with one or more aspects can be performed by instructions of the processor and are illustrated in FIG. 5. In step 502 a fault location is determined in a network by a processor, either from a sensor or a tripped switch or any other means. In step 504 it is determined by the processor what the effect of the fault is and especially a disconnected substation that would feed one or more metered devices in one or more participant sites connected to the disconnected substation is determined. In step 506, based on a stored configuration of the network including a description of substations and switches, it is determined by the processor what a viable route would be to reconnect the disconnected substation to a power source. There may be more than 1 possible route. A route is considered viable when connecting the disconnected substation will not run into a substation power constraint. It may be known under certain conditions that at least one live substation is at the edge of a power constraint and there is no opportunity to attach any further demand or to reduce the power demand. Under those conditions a route with such a substation is not viable.

In step 508 possible power constraints are determined under the assumption that these constraints can be addressed. In step 510 it is analyzed if issuing a DR (Demand Response) signal by the processor would address the constraint. In step 512 it is determined that shedding power from one or more live Participant Sites based on DR signals would address the constraint. In step 514 it is decided that either current live sites cannot shed any power and/or that in addition to step 512 disconnected participant sites have to be selectively connected and approached with a DR signal to shed power to bring other Participant Sites up.

The reduction of power by declaring a DR event for participant sites of one substation has been disclosed. In another embodiment of the present invention two or more substations each with participant sites are in a viable path and it may be required to declare a DR event and reduce power by DR signals in participant sites of at least two substations.

Once the requirements for the power constraints have been met, power has been adequately reduced for instance and a viable route can be effectuated, an operator or the processor closes one or more switches that effectuate the viable route and a status of a substation changes from disconnected to connected. In case of selectively connecting Participant Sites one may say that a disconnected substation is now partially connected.

In one embodiment of the present invention, there may be two or more viable routes to reconnect a disconnected substation. One may select one from a set of criteria to determine the actual restoration route. For instance, one criterion may be the route that is the physically shortest route. Another criterion is to select the route that includes the least number of substations or the least number of switches. Yet another criterion is to select the route that allows the shedding of most power based on DR signals, while yet another criterion may be to select the route that allows the shedding of the least power based on DR signals.

In yet another embodiment of the present invention, at least two substations (a first substation and a second substation) are disconnected and need to draw power from the same power source. In one embodiment of the present invention, one criterion for analysis is for the processor to determine all possible viable routes that would connect at least two disconnected substations. This problem may be too complex or time consuming to calculate in a reasonable time. In one embodiment of the present invention, the processor determines first a viable route for the substation supporting the greatest number of households and then goes down to the substation supporting the next level of households. In one embodiment of the present invention, the substation requiring the most power is selected as being evaluated first to be restored. In one embodiment of the present invention, a substation supporting a critical operation, such as a hospital or a production facility, is selected to be evaluated first.

In another embodiment of the present invention, a substation feeding a Participant Site with a highest level of opting in to be managed by Demand Response events, is selected to be first to be evaluated to be reconnected. A highest level may be an absolute highest level of power. A highest level may also be a percentage of consumers that has opted in. Other criteria can be applied and preselected.

In one embodiment of the present invention, a Participant Site has at least two different levels of power shedding. For instance in a first level all opted in air conditioning units will be disconnected. In a second level all opted in laundry equipment (washers and dryers) will be disconnected, while in a third level all opted in water heaters may be disconnected.

Based on a severity of an outage, a DR event of one of the different levels may be declared to disconnect devices. If a severe outage takes place, for instance with two or more substations being disconnected, a DR event may be declared that disconnects all devices that can possibly be disconnected by a DR signal. With a less severe outage one may selectively switch off fewer devices.

In one embodiment of the present invention, one may switch off all DR signal enabled devices in a Participant Site of a disconnected substation that is selectively restored. In another embodiment of the present invention only part of the DR signal enabled devices are switched off that are in a Participant Site of a disconnected substation that is selectively restored.

Figure 6:
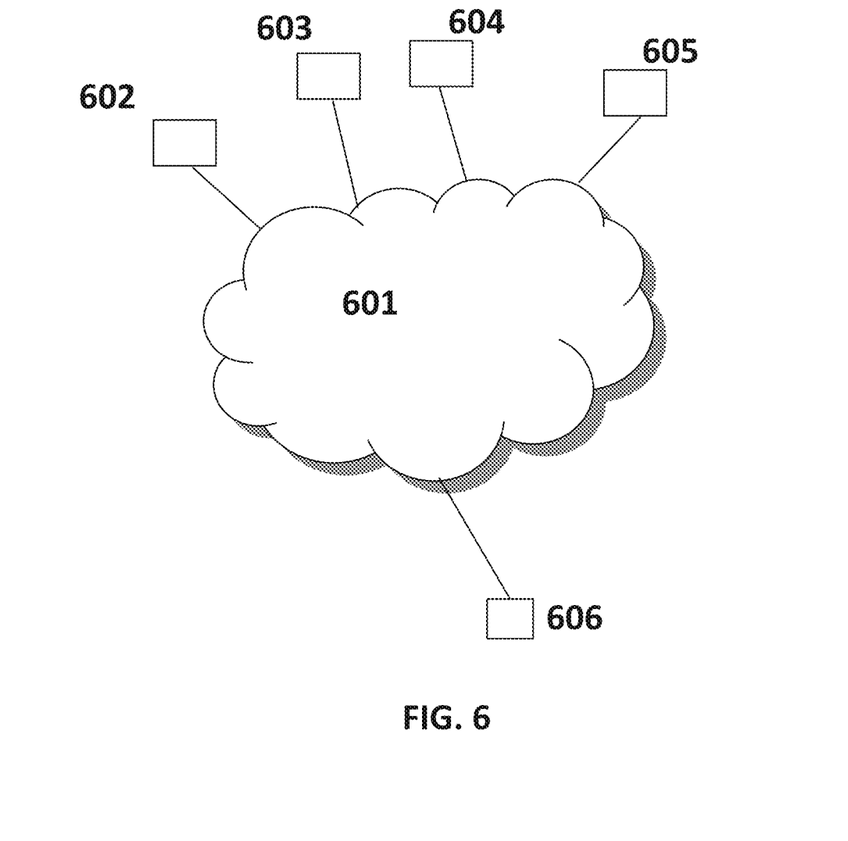
FIG. 6 illustrates a network in accordance with at least one aspect of the present invention.

In one embodiment of the present invention, substations, switches, transformers and power consuming devices in a Participant Area are provided with communication equipment enabled to report a status of a device they are connected with and to receive a signal to open or close a switch or to receive a DR signal that will connect or disconnect a power consuming device. In one embodiment of the present invention the communication devices are enabled to work independently from the grid, for instance via wireless communication and using back-up batteries. The communication equipment is connected through a network 601 as illustrated in FIG. 6. The network may be the Internet, a mobile phone network, a Wi-Fi network, a radio network or any other network that allows equipment to communicate, preferably wirelessly and under condition of a power outage. The network may also be a combination of different networks. Connected to the network are 601 and 602, each representing a communication device of a substation, 603 which representing a communication device of a transformer or a switch that can selectively open or close connection of a Participant Site, 604 representing a communication device of a switch, 605 representing a communication device of a Participant Site power consuming device and 606 which is a processor controlled server.

The server 606 is a computer enabled to perform the steps as provided herein in accordance with various aspects of the present invention. The server 606 collects required status reports from equipment. It has access to a database that stores data relevant to substations, switches, transformers, opted in DR devices and all other static data required to perform the steps. The server assesses the status of the grid evaluates the viable restoration routes and initiates the signals that are part of a restoration.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the claims.

The invention claimed is:

1. A method for controlling a utility network with a power source applying power via a feeder for a substation, which supplies power to a first participant site connected to the substation and is enabled to supply power to a disconnected substation that supplies a second participant site when a switch is closed, the switch being connected to the disconnected substation, comprising:
   determining, by a processor, an amount of power required to be delivered to the disconnected substation when the switch is closed;
   the processor determining a power capacity constraint of the substation;
   the processor determining an amount of power being fed to the first participant site prior to closing the switch;
   the processor determining a reduced amount of power for the first participant site to meet the power capacity constraint of the substation when the switch is closed;
   the processor providing a Demand Response signal to a metered power consumer in the first participant site to contribute to reducing power consumption to meet the reduced amount of power; and
   the processor providing an instruction to close the switch remotely responsive to the Demand Response signal causing the metered power consumer in the first participant site to contribute to reducing the power consumption to meet the reduced amount of power and changing a status of the disconnected station to being connected.

2. The method of claim 1, wherein the utility network has at least 50 sub stations.

3. The method of claim 1, wherein a consumer in the first participant site has opted in to shed power based on a Demand Response event.

4. The method of claim 1, further comprising:
   the processor applying a planning program to determine a viable route to connect the disconnected substation to the power source.

5. The method of claim 1, wherein at least two connected substations, each supporting at least one Participant Site, are in a restoring route of the disconnected sub station.

6. The method of claim 5, wherein Participant Sites of the at least two substations have to shed power based on a Demand Response event to enable changing the status of the disconnected substation.

7. The method of claim 1, further comprising:
   determining by the processor that the second participant site includes one or more devices that are enabled to be switched off based on a Demand Response signal;
   the processor selectively connecting the second participant site to the substation; and
   the processor shedding at least one device in the one or more devices in the second participant site based on the Demand Response signal.

8. The method of claim 1, wherein a number of devices that is switched off by the Demand Response signal depends on a severity of an outage.

9. The method of claim 1, further comprising:
   the processor determining a power capacity constraint of the feeder and the substation; and
   the processor determining a reduced amount of power for the first participant site to meet the power capacity constraint of the feeder and substation when the switch is closed.

10. The method of claim 1, further comprising a communication network enabled to report a status of equipment in the utility network to a server.

11. A system to control a utility network with a power source applying power to a substation, which supplies power to a first participant site connected to the substation and is enabled to supply power to a disconnected substation that feeds a second participant site when a switch is closed, the switch being connected to the disconnected substation, comprising:
    a memory enabled to store data and instructions;
    a processor enabled to retrieve instructions from the memory and to execute the instructions to perform the steps:
      determining a status of the utility network;
      determining an amount of power required to be delivered to the disconnected substation when the switch is closed;
      determining a power capacity constraint of the substation;
      determining an amount of power being fed to the first participant site prior to closing the switch;
      determining a reduced amount of power for the first participant site to meet the power capacity constraint of the substation when the switch is closed;
      providing a Demand Response signal to a metered power consumer in the first participant site to contribute to reducing power consumption to meet the reduced amount of power; and
      providing an instruction to close the switch remotely responsive to the Demand Response signal causing the metered power consumer in the first participant site to contribute to reducing the power consumption to meet the reduced amount of power and changing a status of the disconnected station to being connected.

12. The system of claim 11, wherein the utility network has at least 50 sub stations.

13. The system of claim 11, wherein a consumer in the first participant site has opted in to shed power based on a Demand Response event.

14. The system of claim 11, further comprising:
    the processor applying a planning program to determine a viable route to connect the disconnected substation to the power source.

15. The system of claim 11, wherein at least two connected substations, each supporting at least one Participant Site, are in a restoring route of the disconnected sub station.

16. The system of claim 15, wherein Participant Sites of the at least two substations have to shed power based on a Demand Response event to enable changing the status of the disconnected substation.

17. The system of claim 11, the processor further enabled to perform the steps:

determining that the second participant site includes one or more devices that are enabled to be switched off based on a Demand Response signal;

selectively connecting the second participant site to the substation; and shedding at least one device in the one or more devices in the second participant site based on the Demand Response signal.

18. The system of claim 11, wherein a number of devices that is switched off by the Demand Response signal depends on a severity of an outage.

19. The system of claim 11, wherein at least two substations in the utility network were disconnected and are reconnected.

20. The system of claim 11, further comprising a communication network enabled to report a status of equipment in the utility network to a server.

* * * * *